United States Patent
Kalantzis et al.

(10) Patent No.: US 12,499,100 B2
(45) Date of Patent: Dec. 16, 2025

(54) SYSTEM TO UPDATE THE MOST INFLUENTIAL NODES OF DYNAMIC GRAPHS

(71) Applicant: International Business Machines Corporation, Armonk, NY (US)

(72) Inventors: Vasileios Kalantzis, White Plains, NY (US); Georgios Kollias, White Plains, NY (US); Shashanka Ubaru, Ossining, NY (US); Lior Horesh, North Salem, NY (US); Naoki Abe, Rye, NY (US)

(73) Assignee: International Business Machines Corporation, Armonk, NY (US)

( * ) Notice: Subject to any disclaimer, the term of this patent is extended or adjusted under 35 U.S.C. 154(b) by 38 days.

(21) Appl. No.: 18/526,212

(22) Filed: Dec. 1, 2023

(65) Prior Publication Data

US 2025/0181562 A1    Jun. 5, 2025

(51) Int. Cl.
G06F 16/22         (2019.01)
G06F 16/901        (2019.01)

(52) U.S. Cl.
CPC ...... G06F 16/2228 (2019.01); G06F 16/9024 (2019.01)

(58) Field of Classification Search
CPC .................. G06F 16/2228; G06F 16/9024
See application file for complete search history.

(56) References Cited

U.S. PATENT DOCUMENTS

| | | | |
|---|---|---|---|
| 8,736,612 B1 | 5/2014 | Goldman et al. | |
| 9,075,734 B2 | 7/2015 | Lee et al. | |
| 11,531,710 B2 | 12/2022 | Jianwei et al. | |
| 11,671,436 B1* | 6/2023 | Xu | G06F 18/24 726/22 |
| 2014/0351290 A1 | 11/2014 | Bekas et al. | |
| 2015/0120717 A1 | 4/2015 | Edward et al. | |
| 2019/0163555 A1* | 5/2019 | Zheng | G06F 18/2433 |
| 2021/0174367 A1* | 6/2021 | Harris | G06Q 20/4016 |
| 2021/0271984 A1* | 9/2021 | Li | G06N 7/01 |
| 2021/0365606 A1* | 11/2021 | Yu | G06F 30/20 |

(Continued)

FOREIGN PATENT DOCUMENTS

| | | |
|---|---|---|
| CN | 105306540 A | 2/2016 |
| CN | 106878174 A | 6/2017 |

(Continued)

OTHER PUBLICATIONS

"Appendix for the submission—Asynchronous Randomized Trace Estimation", 21 pages.

(Continued)

*Primary Examiner* — Merilyn P Nguyen
(74) *Attorney, Agent, or Firm* — CHIP LAW GROUP

(57) ABSTRACT

Identifying influential nodes of a graph is provided. The graph is represented by an adjacency matrix and graph updates are represented using different subgraphs corresponding to the graph. Each update of the graph is calculated by approximating partial spectral factorization data for a subgraph of the graph using a previously stored adjacency matrix and information about additional nodes added to the subgraph during the update. Each subgraph is accessed only once. The most influential nodes of the graph are identified based on the partial spectral factorization data.

25 Claims, 9 Drawing Sheets

(56) References Cited

U.S. PATENT DOCUMENTS

2022/0138557 A1* 5/2022 Rossi ................ G06F 16/9024
706/21
2023/0410397 A1* 12/2023 Wang .................... G06N 3/042

FOREIGN PATENT DOCUMENTS

| CN | 109948797 A | 6/2019 |
|----|-------------|--------|
| CN | 115346371 A | 11/2022 |
| CN | 120086412 A | 6/2025 |

OTHER PUBLICATIONS

"Asynchronous Randomized Trace Estimation", 11 pages.
Benzi, et al., "Ranking hubs and authorities using matrix functions", Linear Algebra and its Applications, vol. 438, Issue 5, Dec. 6, 2012 pp. 2447-2474.
Kalantzis et al., "Single-Pass Top-N Subgraph Centrality of Graphs via Subspace Projections", Journal of Latex Class Files, vol. 14, Issue 8, Aug. 2015, 16 pages.
Lembris Laanyuni Njotto, "Centrality Measures Based on Matrix Functions" Open Journal of Discrete Mathematics, vol. 8, Issue 4, The Structure of Complex Networks: Theory and Applications, Oxford University Press, Sep. 26, 2018, 266 pages.
Zhai, et al., "FT-BLAS: A Fault Tolerant High Performance BLAS Implementation on x86 CPUs", IEEE Transactions on Parallel and Distributed Systems, vol. 34, issue 12, Sep. 25, 2023, 18 pages.

* cited by examiner

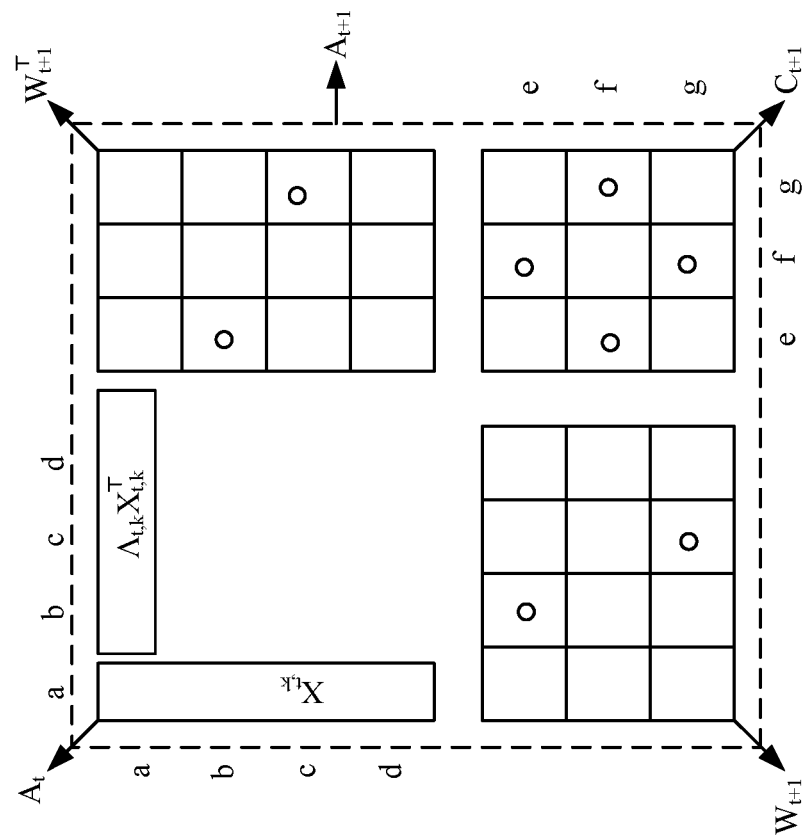
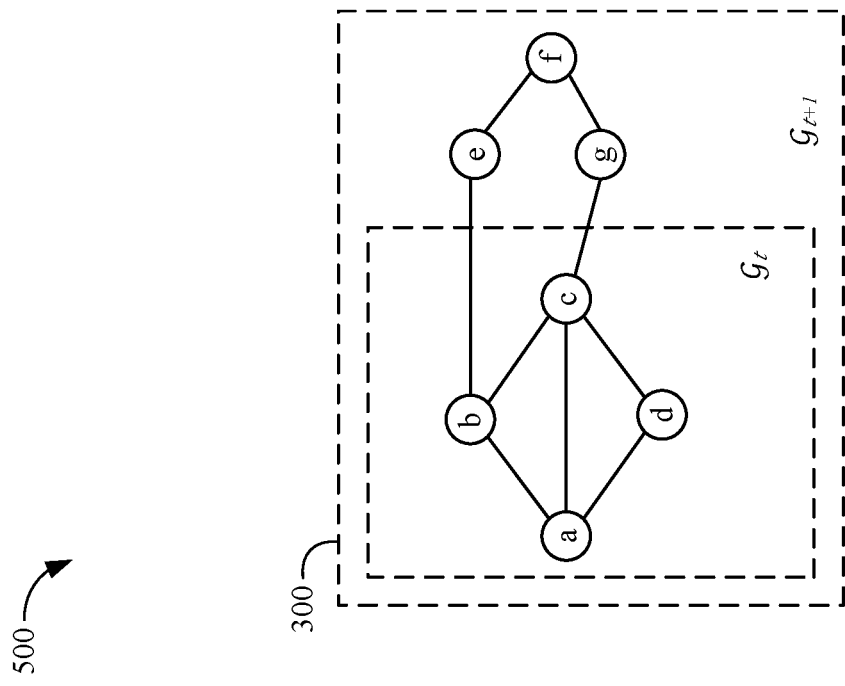
FIG. 5

802 — 1. Input: $A_1 \in \mathbb{R}^{n_1 \times n_1}$, $k, N \in \mathbb{N}$

2. Output: The Top-N Indices of $SC_k(\mathcal{G})$

804 — 3. ▷ Set $t = 1$ and Compute $(X_{1,k}, \Lambda_{1,k})$

4. Do

5. ▷ Receive $C_{t+1}$ and $W_{t+1}$

6. ▷ Compute a Projection Matrix $Z_{t+1}$

806 — 7. ▷ Compute the k Leading Eigenpairs of $Z_{t+1}^T A_{t+1} Z_{t+1}$

8. ▷ From the k Leading Ritz Pairs $(X_{t+1,k}, \Lambda_{t+1,k})$

9. ▷ Update $t = t+1$

10. While there Exist Graph Updates

808 — 11. ▷ Compute $SC_k(\mathcal{G}) = \text{Diag}(X_{t,k} e^{\Lambda_{t,k}} X_{t,k}^T)$ 810 — 12. ▷ Return the Indices Associated with the N Largest Entries of $SC_k(\mathcal{G})$

FIG. 8

SYSTEM TO UPDATE THE MOST INFLUENTIAL NODES OF DYNAMIC GRAPHS

BACKGROUND

The present disclosure relates generally to graph theory, and more specifically, to determining influential nodes in a graph using subgraph centrality measure and partial spectral factorization.

Graph theory is the study of graphs, which are mathematical structures used to model pairwise relations between objects. A graph in this context is made up of vertices or nodes and lines called edges that connect them. Graphs are widely used in applications to model many types of relations and process dynamics in physical, biological, social and information systems. Accordingly, many practical problems in modern technological, scientific and business applications may typically be represented by graphs.

The centrality of a node is a widely used measure to determine the relative importance a node within a full network or graph. Indicators of centrality assign numbers or rankings to nodes within a graph corresponding to their network position. Node centralities may be used to determine which nodes are important in a complex network, to understand influencers, or to find hot spot links. For example, node centralities are typically used to determine how influential a person is within a social network, or, in the theory of space syntax, how important a room is within a building or how well-used a road is within an urban network.

Subgraph centrality is a widely used centrality measure to identify the most influential nodes of graphs. When the graph is static and can fit in a system memory, the subgraph centrality of each node is equal to the corresponding diagonal entry of the exponential of the adjacency matrix. However, many real-world graphs must either be accessed from secondary storage or are updated over time as they are dynamic graphs.

SUMMARY

According to aspects of the present disclosure, a computer-implemented method is provided, which includes obtaining an adjacency matrix corresponding to a first subgraph of a graph. The adjacency matrix is used for calculating a function of the adjacency matrix based on partial spectral factorization data of a previously stored adjacency matrix for a second subgraph of the graph, and update data associated with additional nodes of the first subgraph. The second subgraph is a subset of the first subgraph.

According to other aspects of the present disclosure, a computer-implemented method for updating a dynamic graph is provided, which includes obtaining an adjacency matrix for a first subgraph of the dynamic graph at a time step t+1. The method also includes accessing a projection matrix for a previously stored adjacency matrix for a second subgraph of the dynamic graph. The accessed projection matrix along with for the previously stored adjacency matrix corresponds to a previous time step, t. The accessed projection matrix along with update data for the dynamic graph received at the time step t+1 are used to approximate a projection matrix for the adjacency matrix at the time step t+1. The approximated projection matrix is in turn used to approximate leading eigen pairs for the adjacency matrix at the time step t+1. The dynamic graph is then updated based on the approximated leading eigen pairs and the updated dynamic graph is then stored.

According to other aspects of the present disclosure, a system is provided. The system comprises a circuitry configured to obtain an adjacency matrix corresponding to a first subgraph of a graph. The circuitry is also configured to compute a function of the adjacency matrix based on partial spectral factorization data of a previously stored adjacency matrix for a second subgraph of the graph, and update data associated with additional nodes of the first subgraph. The second subgraph is a subset of the first subgraph.

According to other aspects of the present disclosure, a computer program product for computing a function of an adjacency matrix is provided. The computer program product comprises a computer-readable storage medium having program instructions embodied therewith. The program instructions are executable by the system to cause the system to obtain an adjacency matrix corresponding to a first subgraph of a graph. The program instructions are executable by the system to cause the system to calculate a function of the adjacency matrix based on partial spectral factorization data of a previously stored adjacency matrix for a second subgraph of the graph, and update data associated with additional nodes of the first subgraph.

Additional technical features and benefits are realized through the techniques of the present disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The following description will provide details of preferred embodiments with reference to the following figures wherein:

FIG. 5 is a diagram illustrating projection data calculation for the computation of graph function by the improved graph function calculator, according to an embodiment of the present disclosure;

FIG. 8 is a diagram that illustrates an example algorithm for identifying most influential nodes of a dynamic graph, in accordance with an embodiment of the present disclosure.

DETAILED DESCRIPTION

Figure 1:
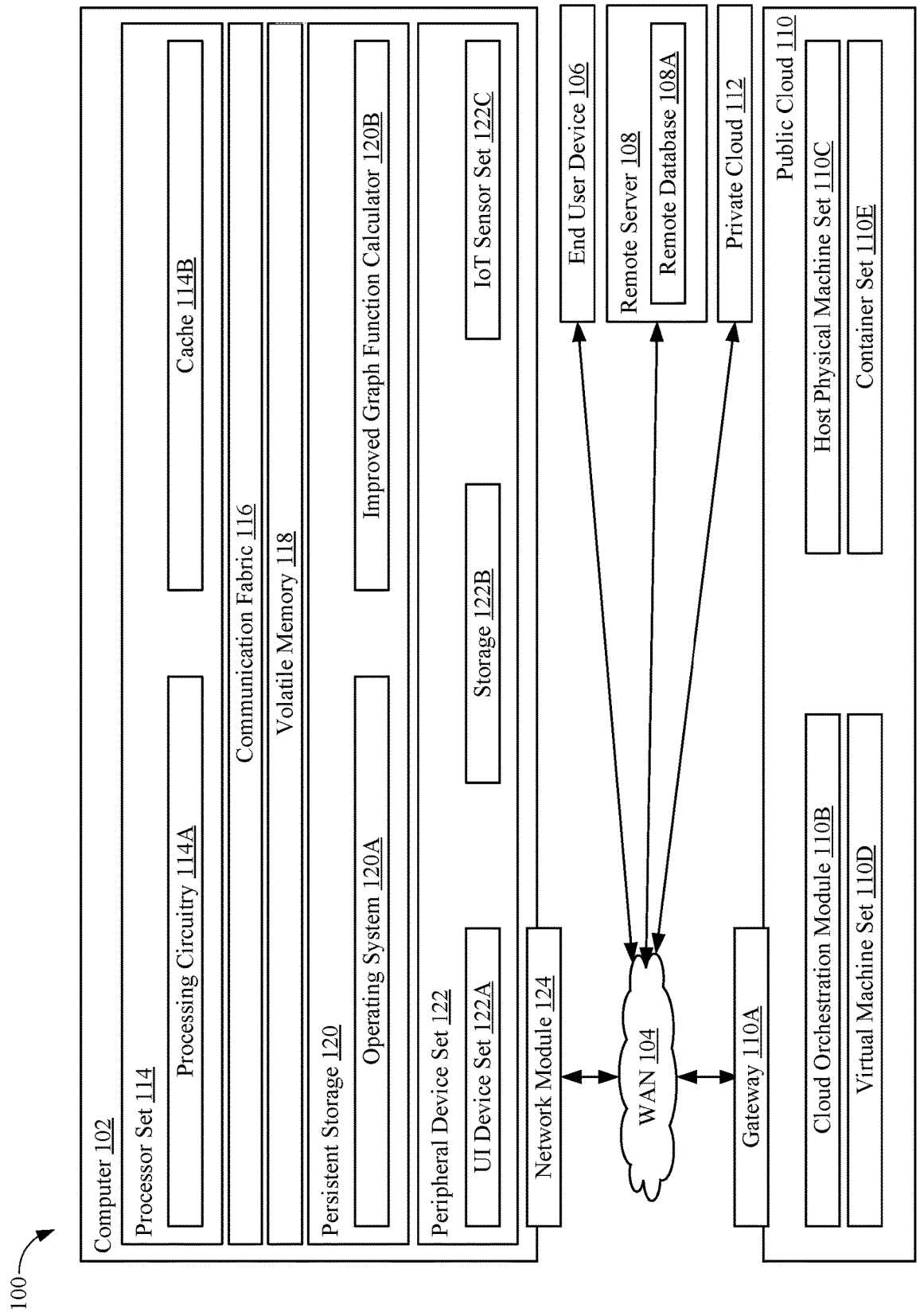
FIG. 1 is a block diagram illustrating a computing environment for calculation of a graph function, in accordance with an embodiment of the present disclosure.

In graph theory and network analysis, indicators of centrality assign numbers or rankings to nodes within a graph corresponding to their network position. Subgraph centrality is a widely used centrality measure to identify the most influential nodes (or vertices) of graphs. When the graph is static and can fit in the system memory, the subgraph centrality of each node is equal to the corresponding diagonal entry of the exponential of the adjacency matrix. However, many real-world graphs are either accessed from secondary storage or are updated over time. Also, in case of dynamic graphs, that are graphs which are created and updated dynamically, their corresponding adjacency matrix might not fit in the system memory due to their large and dynamically changing size.

A common operation involving any graph, specifically a dynamic graph is identifying the most influential nodes of the graph (network) for performing graph analytics. Each node of the graph is associated with a real scalar, known as a centrality score, and the goal is to identify the N∈N nodes of the graph with the largest centrality scores (top-N recommendation). Some applications of top-N centrality include the identification of the most influential nodes in social networks, the main hubs of road and urban networks, as well as the most important proteins in cell networks. There are different types of centrality measures that are used as computational measures to quantify the relative importance of each node of the graph in an application. Some of these types of centrality measures include degree centrality, betweenness centrality, eigen centrality, closeness centrality, page rank centrality and the like. Another centrality measure is subgraph centrality that quantifies number of closed walks of a node, starting and ending at the node. Subgraph centrality gives a measure of participation of the node in a number of subgraphs in the graph.

In one or more embodiments of the present disclosure, an exponential subgraph centrality measure is computed for a graph, which is further used to compute most influential nodes of the graph. The subgraph centrality measure is used in the analysis of networks from a diverse range of applications, including but not limited to biology, neuroscience, and economics. Given an undirected graph of n∈N nodes associated with an n×n adjacency matrix A, the subgraph centrality of the $i^{th}$ graph vertex is equal to the magnitude of the $i^{th}$ diagonal entry of the matrix exponential $e^A$.

For small graphs, computing the subgraph centrality of each vertex can be achieved via matrix diagonalization at $O(n^3)$ cost. However graphs stemming from modern data analytics tasks often feature a massive number of vertices and edge connections, thus rendering the cubic complexity of the computation of the exact subgraph centrality quite costly. This also leads to problem of a graph not fitting into system memory or being out-of-core, due to the large size and high computational complexity.

In one or more embodiments of the present disclosure, a method is provided to approximately identify the most influential node of a graph G when only a small subset of rows of the adjacency matrix A of the graph can reside in the system memory at any given time.

In one or more embodiments of the present disclosure, a method is provided to compute centrality scores, specifically subgraph centrality scores for different nodes of the graph, in applications involving dynamically evolving graphs over the course of different time-steps.

In one or more embodiments of the present disclosure, a method is provided to identify the most influential nodes (i.e., top-N recommendation) of graphs by accessing each submatrix (for a subgraph) of the adjacency matrix only once. To achieve this, the information of matrix updates is accumulated via updating partial spectral factorization data for the adjacency matrix, through Rayleigh-Ritz projections.

One or more embodiments of the present disclosure disclosed herein provide reduced computational complexity associated with computing graph updates. In one or more embodiments, the computational complexity is of the order of linear complexity rather than cubic complexity of conventional approaches, leading to saving and enhanced performance of computing resources of an application. Further, in one or more embodiments of the present disclosure, memory requirements associated with saving large and complex dynamically evolving graphs are simplified because of accessing update data for each graph update only once.

According to an aspect of the disclosure, a computer-implemented method is provided. The computer-implemented method comprises obtaining an adjacency matrix corresponding to a first subgraph of a graph. The computer-implemented method comprises calculating a function of the adjacency matrix based on partial spectral factorization data of a previously stored adjacency matrix for a second subgraph of the graph, and update data associated with nodes that are added to the second subgraph to obtain the first subgraph. The second subgraph is a subset of the first subgraph. Calculating the function of the adjacency matrix based on the partial spectral factorization data requires accessing each adjacency matrix only once, which is computationally less expensive and enables storing very large graphs also in the system memory, as only the update data for such graphs needs to be updated, that too in the form of partial spectral factors.

In various embodiments, the adjacency matrix of the first subgraph is associated with a state of the graph at a current time instance and the previously stored adjacency matrix of the second subgraph is associated with a state of the graph at a previous time instance, such that the previous time instance is earlier than the current time instance. As a result, for computing any function on the adjacency matrix, only computations related to update data need to be performed afresh, while the previously stored data is compactly stored using partial spectral factors.

In various embodiments, the calculated function is used to calculate subgraph centrality data for the graph. The subgraph centrality is used for determining top-N set of nodes of the graph. The top-N set of nodes are nodes of the graph with indices associated with highest subgraph centrality data. The top-N set of nodes provide a dataset of the nodes that are connected to most other nodes of the graph stored in a database. This dataset of the top-N nodes may be stored in the database as the most influential nodes of the graph and may be used in different types of computing applications related to accessing data of the influential nodes of a graph, such as protein analysis computing applications, social network platforms, content platforms for authors, and the like.

In various embodiments, the graph is a dynamic graph and the top-N set of nodes are the most influential nodes of the dynamic graph. The dynamic graph includes data that is updated frequently and thus requires efficient computations, such as with every update, recalculating the most influential node. Thus, using the top-N set of nodes calculated through subgraph centrality computed based on partial spectral factorization data is faster and computationally efficient.

In various embodiments, the dynamic graph corresponds to a graph approximation of a social network, such that nodes of the dynamic graph represent users of the social network and edges of the dynamic graph represent connections between the users of the of the social network, and further such that the most influential nodes of the dynamic graph represent the users of an influencer user type in the social network. The social network may be implemented as a social networking platform, storing data of the users of the social network in a database. The graph approximation of the dynamic graph is stored in this database and is accessed every time a request for accessing data of most influential node of the graph is received. Such request may be received from a computing device through which a user is accessing a social networking application hosted by the social networking platform.

In various embodiments, the partial spectral factorization data is determined based on computing a projection matrix for the adjacency matrix of the first subgraph, based on Rayleigh-Ritz projection computations. Rayleigh-Ritz projection computations including computing Ritz pairs, which are further used as approximations of leading eigenvalues of an adjacency matrix. The problem of k-subgraph centrality is essentially equivalent to computing the k algebraically leading eigenpairs of an adjacency matrix. The use of Rayleigh-Ritz projection computations transforms the complexity of computations of subgraph centrality to computations of leading approximate eigenpairs, which can be done using sparse eigenvalue solvers. Thus, computational complexity of computing subgraph centrality is reduced by the use of Rayleigh-Ritz projection computations.

In various embodiments, the computer-implemented method comprises receiving the update data associated with the nodes that are added to the second subgraph at a time instance t+1. Further the projection matrix for the adjacency matrix at the time instance t+1 based on the Rayleigh-Ritz projection computations is computed. For this projection matrix, k-leading eigen pairs are computed. The computer-implemented method comprises determining k leading Ritz pairs for the k-leading eigen pairs of the projection matrix, and then updating t+1. The steps described above are repeated until a designated end condition is reached. The repetition provides iterative computations of the k-leading eigen pairs as graph data keeps getting updated dynamically. This helps is maintaining up-to-data data about k-leading eigen pairs of the graph, which can be used to perform further calculations in real time, like calculating subgraph centrality.

In various embodiments, the designated end condition is based on availability of the update data for the graph. As a result, as long as updates to the graph are received, up-to-date influential node data is also computed efficiently and stored in a database or memory, storing the graph data.

In various embodiments, the subgraph centrality for the graph based on determining the k leading Ritz pairs is computed at the time of reaching the end condition. This ensures that the problem of computing the subgraph centrality is a convergent problem.

In various embodiments, computing the projection matrix for the adjacency matrix comprises computing, at the time instance t+1, the k leading Ritz pairs for the projection matrix to be same as k leading eigen pairs of the adjacency matrix. This provides one approach for identifying the k leading Ritz pairs for the projection matrix to be used for subgraph centrality computations. Computing k leading Ritz pairs in this manner has a high precision value associated with identification of most influential nodes of the graph.

In various embodiments, computing the projection matrix for the adjacency matrix comprises computing the k-leading eigen pairs of the adjacency matrix based on Schur components. This approach provides a precision value close to 70% when identifying most influential nodes of the graph.

In various embodiments, computing the projection matrix for the adjacency matrix comprises computing a matrix formed by computing orthonormal basis components for the k-leading eigen pairs of the adjacency matrix. This approach provides a high precision value associated with identification of most influential nodes of the graph.

In various embodiments, computing the projection matrix for the adjacency matrix comprises approximating the k-leading eigen pairs of the adjacency matrix using k dominant eigen vectors of a symmetric matrix. This approach provides a high precision value associated with identification of most influential nodes of the graph.

In various embodiments, a previously stored adjacency matrix corresponding to a previous time instance t, with the adjacency matrix corresponding to the subsequent time instance t+1. This provides accessing each submatrix for an adjacency matrix only once.

According to aspects of the present disclosure, a computer-implemented method for updating a dynamic graph is provided. The computer-implemented method comprises obtaining an adjacency matrix for a first subgraph of the dynamic graph at a time step t+1. The computer-implemented method comprises accessing a projection matrix for a previously stored adjacency matrix for a second subgraph of the dynamic graph. The computer-implemented method comprises approximating a projection matrix for the adjacency matrix at the time step t+1 based on the accessed projection matrix for the previously stored adjacency matrix at the time step t, and update data for the dynamic graph received at the time step t+1. The computer-implemented method comprises approximating leading eigen pairs for the adjacency matrix at the time step t+1 based on the approximated projection matrix. The computer-implemented method comprises updating the dynamic graph based on the approximated leading eigen pairs. The computer-implemented method comprises storing the updated dynamic graph. The computer-implemented method provides computationally efficient computation of most influential nodes of the dynamic graph, which are also kept up to date through accessing of memory storing the dynamic graph in an efficient manner.

According to aspects of the present disclosure, a system is provided. The system comprises a circuitry configured to obtain an adjacency matrix corresponding to a first subgraph of a graph. The circuitry is also configured to calculate a function of the adjacency matrix based on partial spectral factorization data of za previously stored adjacency matrix for a second subgraph of the graph, and update data associated with nodes that are added to the second subgraph to obtain the first subgraph, wherein the second subgraph is a subset of the first subgraph. The system provides a computing device and/or software program configured for efficiently calculating most influential node data for a graph, that is a computing approximation of a real world application, such as a social networking application, a protein analysis computing application, and the like.

According to aspects of the disclosure, a computer program product for computing a function of an adjacency matrix is provided. The computer program product comprising a computer-readable storage medium having program instructions embodied therewith, the program instructions executable by a system to cause the system to obtain an adjacency matrix corresponding to a first subgraph of a graph. The system is also caused to calculate a function of the adjacency matrix based on partial spectral factorization data of a previously stored adjacency matrix for a second subgraph of the graph, and update data associated with nodes that are added to the second subgraph to obtain the first subgraph, wherein the second subgraph is a subset of the first subgraph. The computer program product thus provides a computing device and/or software program configured for efficiently calculating most influential node data for a graph, that is a computing approximation of a real world application, such as a social networking application, a protein analysis computing application, and the like.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

FIG. 1 is a block diagram that illustrates a computing environment for calculation of a graph function, in accordance with an embodiment of the disclosure. With reference to FIG. 1, there is shown a computing environment 100 that contains an example of an environment for the execution of at least some of the computer code involved in performing the inventive methods, such as an improved graph function calculator 120B. In addition to block 120B, computing environment 100 includes, for example, a computer 102, a wide area network (WAN) 104, an end user device (EUD) 106, a remote server 108, a public cloud 110, and a private cloud 112. In this embodiment, the computer 102 includes a processor set 114 (including a processing circuitry 114A and a cache 114B), a communication fabric 116, a volatile memory 118, a persistent storage 120 (including an operating system 120A and a block 120B, as identified above), a peripheral device set 122 (including a user interface (UI) device set 122A, a storage 122B, and an Internet of Things (IoT) sensor set 122C), and a network module 124. The remote server 108 includes a remote database 108A. The public cloud 110 includes a gateway 110A, a cloud orchestration module 110B, a host physical machine set 110C, a virtual machine set 110D, and a container set 110E.

The computer 102 may take the form of a desktop computer, a laptop computer, a tablet computer, a smartphone, a smartwatch or other wearable computer, a mainframe computer, a quantum computer, or any other form of a computer or a mobile device now known or to be developed in the future that is capable of running a program, accessing a network, or querying a database, such as the remote database 108A. As is well understood in the art of computer technology, and depending upon the technology, the performance of a computer-implemented method may be distributed among multiple computers and/or between multiple locations. On the other hand, in this presentation of the computing environment 100, detailed discussion is focused on a single computer, specifically the computer 102, to keep the presentation as simple as possible. The computer 102 may be located in a cloud, even though it is not shown in a cloud in FIG. 1. On the other hand, computer 102 is not required to be in a cloud except to any extent as may be affirmatively indicated.

The processor set 114 includes one, or more, computer processors of any type now known or to be developed in the future. The processing circuitry 114A may be distributed over multiple packages, for example, multiple, coordinated integrated circuit chips. The processing circuitry 114A may implement multiple processor threads and/or multiple processor cores. The cache 114B may be memory that is located in the processor chip package(s) and is typically used for data or code that should be available for rapid access by the threads or cores running on the processor set 114. Cache memories are typically organized into multiple levels depending upon relative proximity to the processing circuitry 114A. Alternatively, some, or all, of the cache 114B for the processor set 114 may be located "off-chip." In some computing environments, the processor set 114 may be designed for working with qubits and performing quantum computing.

Computer readable program instructions are typically loaded onto the computer 102 to cause a series of operational steps to be performed by the processor set 114 of the computer 102 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as the cache 114B and the other storage media discussed below. The program instructions, and associated data, are accessed by the processor set 114 to control and direct performance of the inventive methods. In computing environment 100, at least some of the instructions for performing the inventive methods may be stored in the block 120B in persistent storage 120.

The communication fabric 116 is the signal conduction path that allows the various components of computer 102 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

The volatile memory 118 is any type of volatile memory now known or to be developed in the future. Examples include dynamic type random access memory (RAM) or static type RAM. Typically, the volatile memory 118 is characterized by a random access, but this is not required unless affirmatively indicated. In the computer 102, the volatile memory 118 is located in a single package and is internal to computer 102, but, alternatively or additionally, the volatile memory 118 may be distributed over multiple packages and/or located externally with respect to computer 102.

The persistent storage 120 is any form of non-volatile storage for computers that is now known or to be developed in the future. The non-volatility of this storage means that the stored data is maintained regardless of whether power is being supplied to computer 102 and/or directly to the persistent storage 120. The persistent storage 120 may be a read-only memory (ROM), but typically at least a portion of the persistent storage 120 allows writing of data, deletion of data, and re-writing of data. Some familiar forms of the persistent storage 120 include magnetic disks and solid-state storage devices. The operating system 120A may take several forms, such as various known proprietary operating systems or open-source Portable Operating System Interface-type operating systems that employ a kernel. The improved graph function calculator includes code included in block 120B, that typically includes at least some of the computer code involved in performing the inventive methods.

The peripheral device set 122 includes the set of peripheral devices of computer 102. Data communication connections between the peripheral devices and the other components of computer 102 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, the UI device set 122A may include components such as a display screen, speaker, microphone, wearable devices (such as goggles and smartwatches), keyboard, mouse, printer, touchpad, game controllers, and haptic devices. The storage 122B is external storage, such as an external hard drive, or insertable storage, such as an SD card. The storage 122B may be persistent and/or volatile. In some embodiments, storage 122B may take the form of a quantum computing storage device for storing data in the form of qubits. In embodiments where computer 102 is required to have a large amount of storage (for example, where computer 102 locally stores and manages a large database) then this storage may be provided by peripheral storage devices designed for storing very large amounts of data, such as a storage area network (SAN) that is shared by multiple, geographically distributed computers. The IoT sensor set 122C is made up of sensors that can be used in Internet of Things applications. For example, one sensor may be a thermometer and another sensor may be a motion detector.

The network module 124 is the collection of computer software, hardware, and firmware that allows computer 102 to communicate with other computers through WAN 104. The network module 124 may include hardware, such as modems or Wi-Fi signal transceivers, software for packetizing and/or de-packetizing data for communication network transmission, and/or web browser software for communicating data over the internet. In some embodiments, network control functions, and network forwarding functions of the network module 124 are performed on the same physical hardware device. In other embodiments (for example, embodiments that utilize software-defined networking (SDN)), the control functions and the forwarding functions of the network module 124 are performed on physically separate devices, such that the control functions manage several different network hardware devices. Computer readable program instructions for performing the inventive methods can typically be downloaded to computer 102 from an external computer or external storage device through a network adapter card or network interface included in the network module 124.

The WAN 104 is any wide area network (for example, the Internet) capable of communicating computer data over non-local distances by any technology for communicating computer data, now known or to be developed in the future. In some embodiments, the WAN 104 may be replaced and/or supplemented by local area networks (LANs) designed to communicate data between devices located in a local area, such as a Wi-Fi network. The WAN 104 and/or LANs typically include computer hardware such as copper transmission cables, optical transmission fibres, wireless transmission, routers, firewalls, switches, gateway computers, and edge servers.

The End User Device (EUD) 106 is any computer system that is used and controlled by an end user (for example, a customer of an enterprise that operates computer 102) and may take any of the forms discussed above in connection with computer 102. The EUD 106 typically receives helpful and useful data from the operations of computer 102. For example, in a hypothetical case where computer 102 is designed to provide a recommendation to an end user, this recommendation would typically be communicated from the network module 124 of computer 102 through WAN 104 to EUD 106. In this way, the EUD 106 can display, or otherwise present, the recommendation to an end user. In some embodiments, EUD 106 may be a client device, such as a thin client, heavy client, mainframe computer, desktop computer, and so on.

The remote server 108 is any computer system that serves at least some data and/or functionality to the computer 102. The remote server 108 may be controlled and used by the same entity that operates the computer 102. The remote server 108 represents the machine(s) that collect and store helpful and useful data for use by other computers, such as the computer 102. For example, in a hypothetical case where the computer 102 is designed and programmed to provide a recommendation based on historical data, then this historical data may be provided to the computer 102 from the remote database 108A of the remote server 108.

The public cloud 110 is any computer system available for use by multiple entities that provides on-demand availability of computer system resources and/or other computer capabilities, especially data storage (cloud storage) and computing power, without direct active management by the user.

Cloud computing typically leverages the sharing of resources to achieve coherence and economics of scale. The direct and active management of the computing resources of the public cloud 110 is performed by the computer hardware and/or software of the cloud orchestration module 110B. The computing resources provided by the public cloud 110 are typically implemented by virtual computing environments that run on various computers making up the computers of the host physical machine set 110C, which is the universe of physical computers in and/or available to the public cloud 110. The virtual computing environments (VCEs) typically take the form of virtual machines from the virtual machine set 110D and/or containers from the container set 110E. It is understood that these VCEs may be stored as images and may be transferred among and between the various physical machine hosts, either as images or after the instantiation of the VCE. The cloud orchestration module 110B manages the transfer and storage of images, deploys new instantiations of VCEs, and manages active instantiations of VCE deployments. The gateway 110A is the collection of computer software, hardware, and firmware that allows public cloud 110 to communicate through WAN 104.

Some further explanation of virtualized computing environments (VCEs) will now be provided. VCEs can be stored as "images". A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

The private cloud 112 is similar to public cloud 110, except that the computing resources are only available for use by a single enterprise. While the private cloud 112 is depicted as being in communication with the WAN 104, in other embodiments a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, the public cloud 110 and the private cloud 112 are both part of a larger hybrid cloud.

In one or more embodiments of the present disclosure, the computer 102 is used to store the improved graph calculation function 120B that provides computation of functions for a graph. The functions include, but are not limited to, measures of centrality defined earlier, specifically the subgraph centrality.

Figure 2:
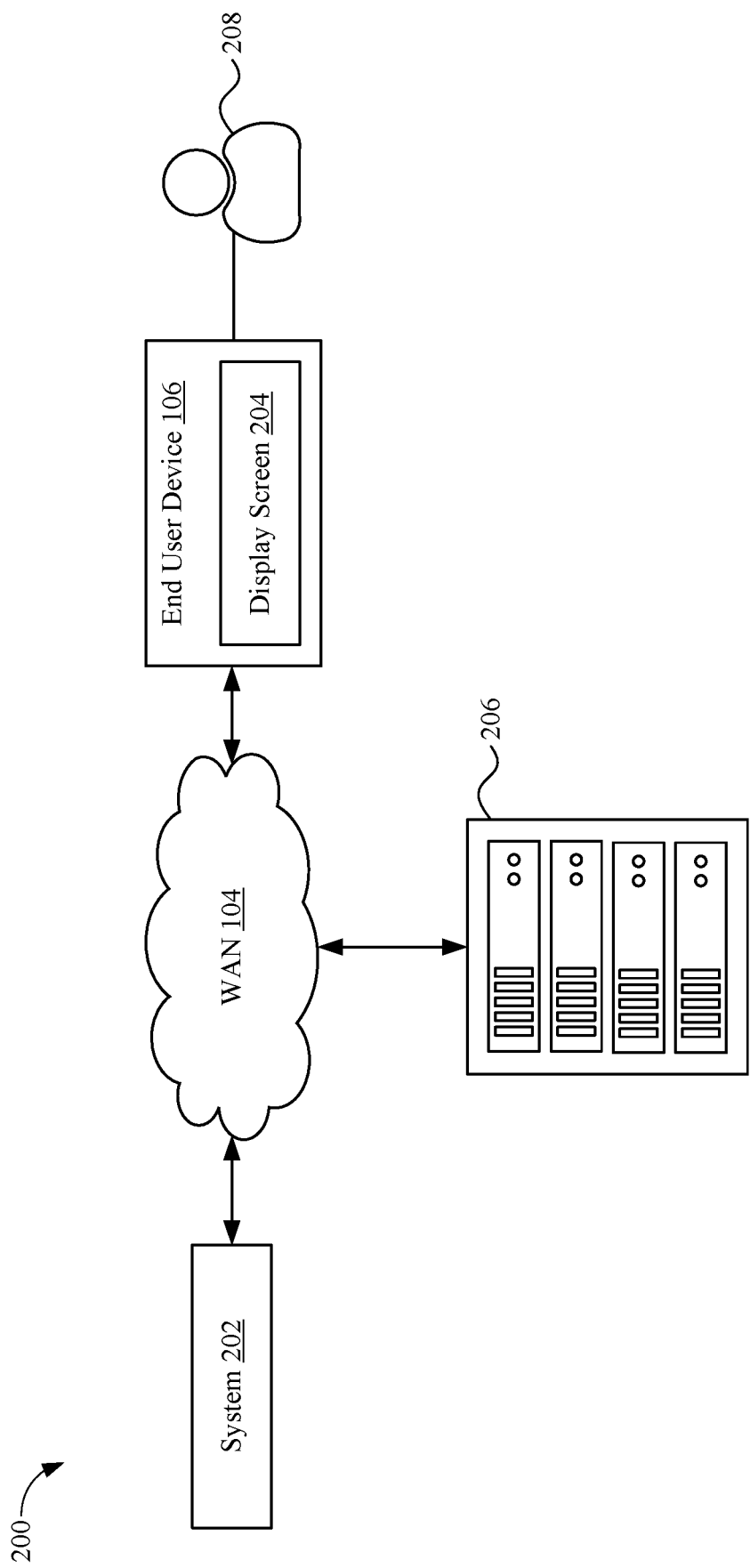
FIG. 2 is a block diagram of an environment for calculation of a graph function, in accordance with an embodiment of the present disclosure.

FIG. 2 is a block diagram of an environment for calculation of a graph function, in accordance with an embodiment of the disclosure. FIG. 2 is explained in conjunction with elements from FIG. 1. With reference to FIG. 2, there is shown a diagram of a network environment 200. The network environment 200 includes a system 202, a display screen 204, a server 206, and a user 208. The network environment 200 may further include the EUD 106, and the WAN 104 of FIG. 1. The system 202 may be an example of the computer 102 of FIG. 1 in one embodiment.

In an embodiment of the present disclosure, the system 202 comprises an application installed on the computer 102 and is accessed by a user associated with the EUD 106.

In an embodiment of the present disclosure, the system 202 may include suitable logic, circuitry, interfaces, and/or code that may be configured to calculate a graph function.

Examples of the system 202 may include, but are not limited to, a computing device, a virtual computing device, a mainframe machine, a server, a computer workstation, a smartphone, a cellular phone, a mobile phone, a gaming device, a consumer electronic (CE) device and/or any other device with trace calculation capabilities.

The EUD 106 may include suitable logic, circuitry, interfaces, and/or code that may provide an adjacency matrix, as a user input, to the system 202. In another embodiment, the EUD 106 may be configured to output the calculated graph function of the adjacency matrix on the display screen 204. Specifically, the system 202 may control the display screen 204 of the EUD 106 to display the calculated graph function of the adjacency matrix on the display screen 204. The EUD 106 may be associated with the user 208 who might wish to calculate the graph function to generate a solution of a graph analysis problem. Examples of the EUD 106 may include, but are not limited to, a computing device, a mainframe machine, a server, a computer workstation, a smartphone, a cellular phone, a mobile phone, a gaming device, a consumer electronic (CE) device and/or any other device with graph function calculation capabilities.

The display screen 204 may comprise suitable logic, circuitry, and interfaces that may be configured to display the graph function of the graph analysis problem. In an embodiment, the display screen 204 may further display one or more user interface elements from which the user 208 may be able to provide the user inputs. In some embodiments, the display screen 204 may be an external display device associated with the EUD 106. The display screen 204 may be a touch screen which may enable the user to provide the user input via the display screen 204. The touch screen may be at least one of a resistive touch screen, a capacitive touch screen, or a thermal touch screen. The display screen 204 may be realized through several known technologies such as, but are not limited to, at least one of a Liquid Crystal Display (LCD) display, a Light Emitting Diode (LED) display, a plasma display, or an Organic LED (OLED) display technology, or other display devices. In accordance with an embodiment, the display screen 204 may refer to a display screen of a head mounted device (HMD), a smart-glass device, a see-through display, a projection-based display, an electro-chromic display, or a transparent display.

The server 206 may include suitable logic, circuitry, and interfaces, and/or code that may be configured to store the graph 200 and its data. The server 206 may be further configured to store a result of the computation of the graph function, such as a projection matrix for the graph 200, the approximated graph, the graph update data, and the like. The server 206 may be implemented as a cloud server and may execute operations through web applications, cloud applications, HTTP requests, repository operations, file transfer, and the like. Other example implementations of the server 206 may include, but are not limited to, a database server, a file server, a web server, a media server, an application server, a mainframe server, or a cloud computing server.

In at least one embodiment, the server 206 may be implemented as a plurality of distributed cloud-based resources by use of several technologies that are well known to those ordinarily skilled in the art. A person with ordinary skill in the art will understand that the scope of the disclosure may not be limited to the implementation of the server 206 and the system 202 as two separate entities. In certain embodiments, the functionalities of the server 206 can be incorporated in its entirety or at least partially in the system 202 or vice-versa, without a departure from the scope of the disclosure.

In operation, the user 208 may wish to solve the graph analysis problem. The graph analysis problem may correspond to a category of computational problems that may involve studying and drawing insights from graphs.

In an embodiment, the graph analysis problem may be associated with real-world problems because the graph analysis problems may provide a powerful framework for modelling, understanding, and solving complex issues that may involve relationships, connections, and interactions among entities.

In an embodiment of the present disclosure, the graph analysis problem may include an analysis of dynamic graphs, when the graph is represents a dynamic graph.

In an embodiment of the present disclosure, the dynamic graph corresponds to a graph approximation of a social network, such that nodes of the dynamic graph represent users of the social network and edges of the dynamic graph represent connections between the users of the of the social network, and further such that the most influential nodes of the dynamic graph represent the users of an influencer user type in the social network. The edges of the dynamic graph represent friendship relations between the users of the social network. In this dynamic graph, adding users to the network amounts to adding new nodes while a friend addition implies the insertion of a new edge.

In an embodiment of the present disclosure, the dynamic graph corresponds to a road network. The nodes of such dynamic graph are destinations and the connections between the destinations, such as through different paths are edges of the dynamic graph. The most influential nodes of the dynamic graph may then represent main hubs of the road network that experience high traffic/user footfall.

In an embodiment of the present disclosure, the dynamic graph corresponds to a collaboration network. The nodes of the dynamic graph may be authors and edges denote a paper (or collaboration between different authors). The most influential nodes of the dynamic graph may then represent the most influential authors.

In an embodiment of the present disclosure, the dynamic graph corresponds to a protein network. The nodes of the dynamic graph denote proteins and edges of the dynamic graph denote interactions between the proteins. The most influential nodes of the dynamic graph may then represent the most important proteins.

Figure 3:
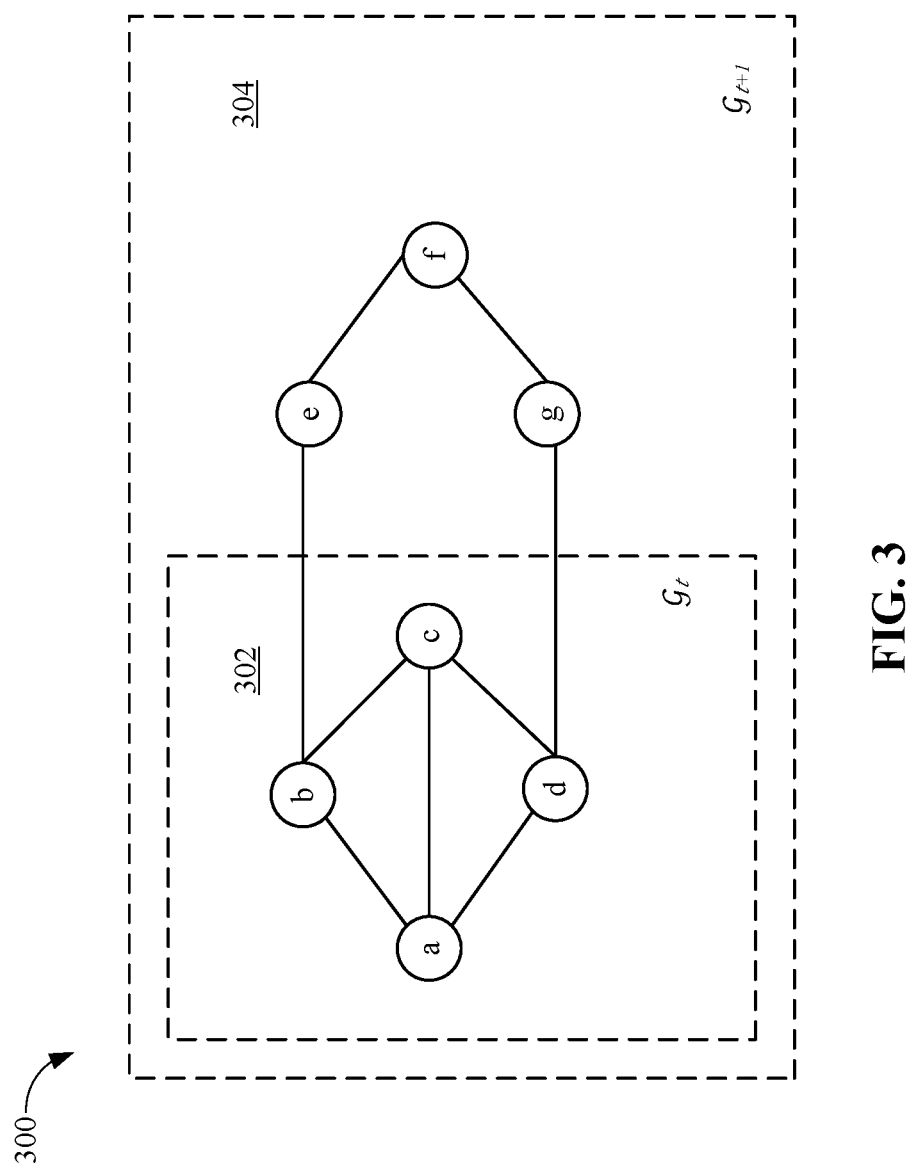
FIG. 3 is a diagram of a graph that evolves dynamically over time, according to an embodiment of the present disclosure.

In one or more embodiments of the present disclosure, the dynamic graph evolves dynamically over different time steps. The dynamic graph has different states at different time steps because of nodes being added to (or removed from) the dynamic graph at different time steps. For real-time applications using a dynamic graph, information about state of the dynamic graph at different time steps forms graph update data. The graph update data is needed to be accumulated accurately and efficiently for most real-time applications. FIG. 3 illustrates such a graph that evolves dynamically over time.

FIG. 3 is a diagram of a graph 300 that evolves dynamically over time. In one or more embodiments of the present disclosure, the graph 300 represents a dynamic graph (hereinafter the terms dynamic graph and graph 300 would be used interchangeably within the scope of the present disclosure).

As shown in FIG. 3, the graph 300 has a state 302 at a time step t, which is represented by a subgraph $\mathcal{G}_t$. Further, the graph 300 has a state 304 at a time step t+1, which is represented by a subgraph $\mathcal{G}_{t+1}$. The subgraph $\mathcal{G}_{t+1}$ is a first subgraph of the graph 300, and the subgraph Gt is a second subgraph of the graph 300. Each of the first subgraph and the second subgraph have one or more nodes.

The subgraph $\mathcal{G}_t$ has four nodes—node a, node b, node c, and node d. The subgraph $\mathcal{G}_{t+1}$ has seven nodes, four of the previous nodes—node a, node b, node c, and node d, and three additional nodes—node e, node f, and node g. Connections between nodes represent edges. The three additional nodes node e, node f, and node g are added to the subgraph Gt at time step t+1 to obtain the subgraph $\mathcal{G}_{t+1}$. Also, subgraph $\mathcal{G}_t \subseteq \mathcal{G}_{t+1}$. The data of the three additional nodes is update data associated with the (three) additional nodes that are added to the second subgraph Gt to obtain the first subgraph $\mathcal{G}_{t+1}$, such that the second subgraph $\mathcal{G}_t$ is a subset of the first subgraph $\mathcal{G}_{t+1}$.

It may be understood by one of ordinary skill in the art that the number of nodes shown in the graphs of FIG. 3 are limited for the sake of brevity. However, such graphs depicted in FIG. 3 may have any number of nodes in equivalent applications, without deviating from the scope of the present disclosure.

In an embodiment of the present disclosure, the graph 300 is stored in the computer 102, such as in the persistent storage 120 of the computer 102.

In another embodiment of the present disclosure, the graph 300 is stored in the remote server 108, such as in the remote database 108A and accessed from the computer 102.

In an embodiment of the present disclosure, the computer 102 accesses an application, such as a social networking site, a navigation and mapping service, a biological compound analytics application, a business analytics application, an analytics platform hosting an analytics service, an enterprise resource management application, an application related to management of data in a data center, a financial application, and the like. The application stores the data required for implementing different functionalities of the application in the form of the graph 300, specifically a dynamic graph.

In an embodiment of the present disclosure, the graph 300 is used for analytics and so data of the graph 300 is managed using schema and data mapping algorithms associated with a graph platform. The graph platform may be implemented such as by any of the computer 102 or the remote server 108.

In an embodiment of the present disclosure, the graph platform is a relational graph platform and data in the relational graph platform is processed using data mining algorithms.

In an embodiment of the present disclosure, the graph 300 is accessed to calculate a function of the graph 300 for the system 200, which may be any of an application (an "app") or a product, embodied in the form of either software code or a dedicated hardware, which enables different types of analytics operations on the graph 300. Some of these analytics operations were described above. The analytics is done by executing the improved graph function calculator 120B described in FIG. 1 earlier.

In one embodiment of the present disclosure, each of the subgraphs of the graph the graph 300—that is, the second subgraph $\mathcal{G}_t$ and the first subgraph $\mathcal{G}_{t+1}$, is represented by an adjacency matrix. The adjacency matrix may be a square matrix that may represent the connections or relationships between nodes (or vertices) in a graph. Each entry in the adjacency matrix may correspond to a potential edge between two nodes, and its value indicates whether there is a connection between those nodes or not. Typically, in the graph, the adjacency matrix may be symmetric, with a "1" in the entry (i, j) if nodes i and j are connected and a "0" if they are not. Hence, the adjacency matrix may provide a structured way to encode the graph's connectivity and may be a fundamental tool for performing one or more graph-related computations and algorithms, making it essential in various graph analysis problems, from social network analysis to transportation route optimization and beyond. In an embodiment of the present disclosure, the graph 300 is an undirected graph of n∈ N nodes or vertices associated with an n×n adjacency matrix A, the subgraph centrality of the $i^{th}$ graph node is equal to the magnitude of the $i^{th}$ diagonal entry of the matrix exponential $e^A$.

In one embodiment of the present disclosure, the system 202 is configured to obtain an adjacency matrix $A_{t+1}$ corresponding to the first subgraph $\mathcal{G}_{t+1}$ of the graph 300. Further, the system 300 is configured to compute a function of the adjacency matrix $A_{t+1}$ based on partial spectral factorization data of a previously stored adjacency matrix $A_t$ for the second subgraph of the graph Gt, and update data associated with additional nodes of added to the second subgraph Gt to obtain the first subgraph $\mathcal{G}_{t+1}$.

In an embodiment of the present disclosure, the adjacency matrix $A_{t+1}$ of the first subgraph $\mathcal{G}_{t+1}$ is associated with a state of the graph 300 at a current time instance, t+1, and the previously stored adjacency matrix $A_t$ of the second subgraph $\mathcal{G}_t$ is associated with a state of the graph 300 at a previous time instance, t, such that the previous time instance is earlier than the current time instance. The second subgraph is thus a subset of the first subgraph, i.e., $\mathcal{G}_t \subseteq \mathcal{G}_{t+1}$.

In an embodiment of the present disclosure, the improved graph function calculator 120B of FIG. 1 calculates a function of the adjacency matrix $A_{t+1}$ of the subgraph $\mathcal{G}_{t+1}$, which is further used for calculating subgraph centrality data for the graph 300, by the improved graph function calculator 120B. Further, the improved graph function calculator 120B is configured for determining top-N set of nodes of the graph 300 based on the calculated subgraph centrality, such that the top-N set of nodes are nodes of the graph 300 with indices associated with highest subgraph centrality data. These top-N nodes are then used to identify most influential nodes of the graph 300 as part of the graph analysis problem.

In an embodiment of the present disclosure, the graph 300, which may be referred to as graph G, is stored outside the main system memory, such as outside the persistent storage 120 of the computer 102, and is parsed over several time-steps such that the partial graph processed up to time-step 't', $\mathcal{G}_t$, is an induced subgraph of the partial graph processed up to time-step 't+1', $\mathcal{G}_{t+1}$.

Let $A \in R^{n \times n}$ denote the adjacency matrix associated with the undirected graph $\mathcal{G} := \{\mathcal{V}, \varepsilon\}$, where $\mathcal{V}$ denotes a set of $\mathcal{G}_n$ vertices and $\varepsilon \subseteq \{(i, j) | (i, j) \in \mathcal{V}^2, i \neq j\}$ denotes the corresponding set of graph edges. The subgraph centrality of a vertex (or equivalently node) $\phi \in \mathcal{V}$ measures the number of closed walks that start and end at $\phi$ while each closed walk is weighted inversely proportional to its length. The $\phi_{th}$ diagonal entry of a matrix $A^j$ denotes the number of closed walks of length j that start and end at vertex $\phi$, the subgraph centrality of vertex $\phi$ is expressed as: $SC(\phi) = \Sigma_{j=0} A_{\phi\phi}^j / j! = e_{\phi\phi}^A$ Accounting for all n vertices, the subgraph centrality of the vertices of $\mathcal{G}$ is given as an n-length vector:

$$SC(\mathcal{G}) = \text{diag}(e^A) = \sum_{i=1}^{n} e^{\lambda_i} \text{diag}(x_i x_i^T) \qquad \text{Eq. (1)}$$

where $((\lambda_i, x_i))$ denotes the $i^{th}$ eigenpair of A and the eigenvalues are ordered algebraically as $\lambda_1 \geq \ldots \geq \lambda_n$. The Eq. 1 requires the computation of all n eigenpairs of A and thus becomes impractical for anything but small-scale graphs. In one or more embodiments of the present disclosure, applications of subgraph centrality generally require only the detection of the few most influential vertices of $\lambda_i$. The contribution of each rank-1 term $x_i x_i^T$ in Eq. (1) is weighed by the scalar $e^{\lambda_i}$, meaning that the contribution of each eigenpair diminishes rapidly relative to the algebraic value of $\lambda_i$.

Let k∈ N satisfy 1≤k≤n and define the matrices $\Lambda_k = \text{diag}(\lambda_1, \ldots, \lambda_k)$ and $X_k = [x_1, \ldots, x_k]$. Then, the k-subgraph centrality of the graph $\mathcal{G}$ is defined as:

$$SC_k(\mathcal{G}) = \text{diag}(X_k e^{\Lambda_k} X_k^T) = \sum_{i=1}^{k} e^{\lambda_i} \text{diag}(x_i x_i^T) \qquad \text{Eq.(2)}$$

A sufficient value of k to determine the top-N centrality scores can be determined on-the-fly by setting k=1 and increasing its value until the top-N recommendation achieved by two successive k-subgraph centrality approximations are equal up to machine epsilon.

In some embodiments, the top-N recommendation includes identifying N∈ N largest entries of indices of SC ($\mathcal{G}$) ($SC_k(\mathcal{G})$). These are top-N set of nodes of the graph, or any of subgraph having indices associated with highest subgraph centrality data. The subgraph centrality data for the graph 300 is in turn calculated based on the calculated graph function. In one embodiment of the present disclosure, the function is such as the leading eigen pairs identification function. In one embodiment of the present disclosure, the function is the k-subgraph centrality as per Eq. (2). The calculation of the improved graph function is done efficiently by the proposed embodiments, as each submatrix corresponding to adjacency matrix of a subgraph of the graph 300 is accessed only once. A method outlining the implementation of the improved graph function is illustrated in FIG. 4.

Figure 4:
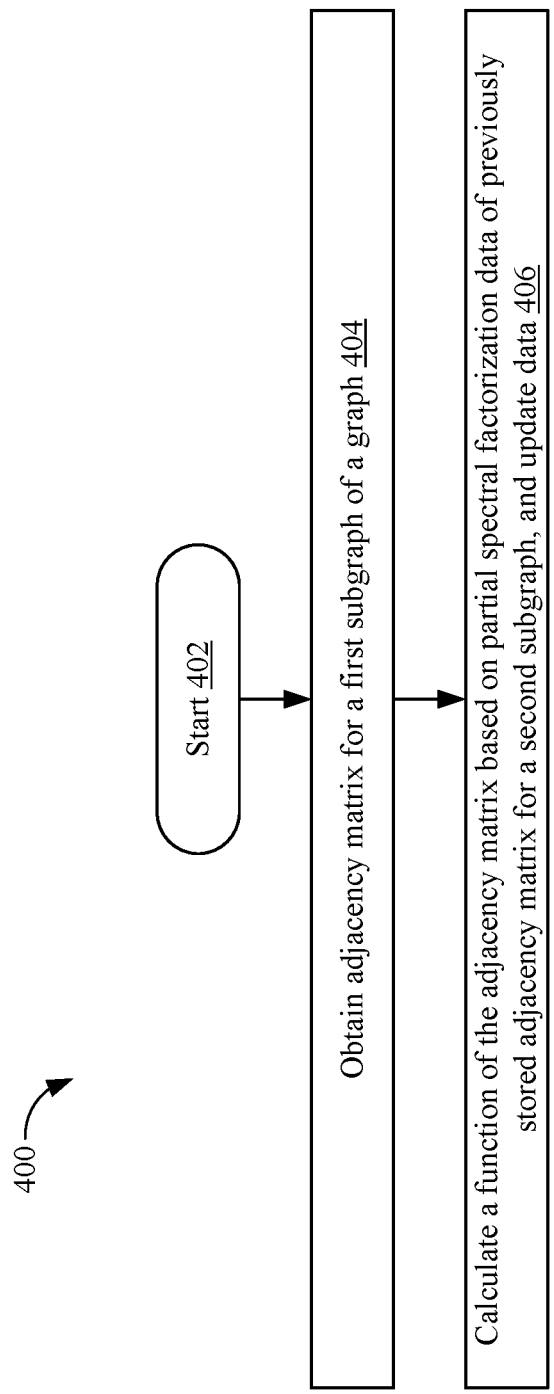
FIG. 4 is a flowchart of an exemplary method for calculation a graph function, according to an embodiment of the present disclosure.

FIG. 4 is a flowchart of a method showing exemplary operations for graph function calculation, in accordance with an embodiment of the disclosure. FIG. 4 is explained in conjunction with elements from FIG. 1, FIG. 2, and FIG. 3. With reference to FIG. 4, there is shown a flowchart of a method 400 that illustrates exemplary operations from 402 to 406, as described herein. The exemplary operations illustrated in the method 400 may start at 402 and may be performed by any computing system, apparatus, or device, such as by the computer 102 of FIG. 1 or the system 202 of FIG. 2. Although illustrated with discrete blocks, the exemplary operations associated with one or more blocks of the method 400 may be divided into additional blocks, combined into fewer blocks, or eliminated, depending on the particular implementation.

At 402, the method 400 for calculation of a graph function starts. At 404, an adjacency matrix for a first subgraph of a graph is obtained. For example, adjacency matrix $A_{t+1}$ corresponding to the first subgraph $\mathcal{G}_{t+1}$ is obtained. In one embodiment, the adjacency matrix $A_{t+1}$ is obtained from an out-of-core storage, such as from the remote server 108. In one embodiment, the adjacency matrix $A_{t+1}$ is computed by the processor set 114 of the computer 102.

At 406, a function of the adjacency matrix $A_{t+1}$, also referred to equivalently as the graph function, is calculated. The calculation of the graph function is done on the basis of partial spectral factorization data of a previously stored adjacency matrix for a second subgraph of the graph and update data associated with nodes that are added to the second subgraph to obtain the first subgraph. For example, referring to FIG. 3, the graph function is calculated based on the previously stored adjacency matrix $A_t$ of the second subgraph $\mathcal{G}_t$ and the updated data of the additional nodes-node e, node f, and node g, that are added to the second subgraph $\mathcal{G}_t$ to obtain the first subgraph $\mathcal{G}_{t+1}$.

In an embodiment of the present disclosure, the graph function is the k-subgraph centrality $SC_k(\mathcal{G})$ defined in Eq. (2). The nodes of the graph $\mathcal{G}$ are partitioned into $f \in \mathbb{N}$ non-overlapping subsets $\mathcal{V}_1, \ldots, \mathcal{V}_f$ such that $\mathcal{V}_1 \cup \ldots \cup \mathcal{V}_f = \varepsilon$. Similarly, the set of edges of G is partitioned into f non-overlapping sets $\varepsilon_1, \ldots, \varepsilon_f$ such that $\varepsilon_1 \cup \ldots \cup \varepsilon_f = \varepsilon$. Starting with the initial edge-set $\varepsilon_1 = \{(i,j)|(i,j) \in \mathcal{V}_1^2, i \neq j\}$, it is defined that:

$$\varepsilon_q = \{(i,j) \mid i \in \mathcal{V}_g \,\&\&\, j \in \mathcal{V}_q \,\forall\, g \leq q\} \quad \text{Eq. (3)}$$

According to Eq. (3), the edge-set $\varepsilon_q$ includes all edges of $\mathcal{G}$ for which either—a) both endpoints lie in $\mathcal{V}_q$, or b) one endpoint lies in $\mathcal{V}_q$ and the other one in $\mathcal{V}_g$ where $g < q$.

The above partitioning enables accessing $\mathcal{G}$ in a sequential order consisting of f time-steps, where during time-step 't+1' information related to the sets $\mathcal{V}_{t+1}$ and $\varepsilon_{t+1}$ is accessed by the system 202 or equivalently by the improved graph function calculator 120B.

In some embodiments of the present disclosure, graph information accessed before the current time-step is overwritten by a low-rank partial spectral factorization data. The partial spectral factorization data is determined based on computing a projection matrix for the adjacency matrix $A_{t+1}$ of the first subgraph $\mathcal{G}_{t+1}$, based on Rayleigh-Ritz projection computations. The computations of Rayleigh-Ritz projection is further explained with reference to FIG. 5.

FIG. 5 is a diagram illustrating projection data calculation for the computation of graph function by the improved graph function calculator 120B, according to an embodiment of the present disclosure.

Referring to FIG. 5, $\mathcal{G}t$ is the induced subgraph of G processed up to time-step 't' where the matrix pair $(X_{t,k}, \Lambda_{t,k})$ corresponds to k leading eigen pairs of the adjacency matrix $A_t$. Also $\mathcal{G}_{t+1}$ is the induced subgraph of G processed up to time-step 't+1'. In order to calculate the graph function at time step t+1, the improved graph function calculator 120B is configured to first obtain the adjacency matrix $A_{t+1}$ of the first subgraph $\mathcal{G}_{t+1}$. The obtained adjacency matrix $A_{t+1}$ of the first subgraph $\mathcal{G}_{t+1}$ is a surrogate adjacency matrix. A matrix pair $(X_{t+1,k}, \Lambda_{t+1,k})$ is calculated. The matrix pair $(X_{t+1,k}, \Lambda_{t+1,k})$ approximates the k leading eigenpairs of the surrogate adjacency matrix $A_{t+1}$.

$$A_{t+1} = \begin{bmatrix} A_t \equiv X_{t,k}\Lambda_{t,k}X_{t,k}^T & W_{t+1}^T \\ W_{t+1} & C_{t+1} \end{bmatrix}$$

As shown in FIG. 5, $W_{t+1}$, $W_{t+1}^T$ and $C_{t+1}$ form update data associated with nodes that are added to the second subgraph Gt to obtain the first subgraph $\mathcal{G}_{t+1}$.

$W_{T+1}^T \in \mathbb{R}^{n_t \times s_{t+1}}$, $C_{t+1} \in \mathbb{R}^{s_{t+1} \times s_{t+1}}$, $n_t = \Sigma_{p=1}^{p=t}|\mathcal{V}_p|$, and $s_{t+1} = |\mathcal{V}_{t+1}|$. As an initial condition, $A_1 = X_{1,k} \Lambda_{1,k} X_{1,k}^T$.

The matrix $W_{t+1}$ comprises data corresponding to coupling between the nodes $n_t$ (node a, node b, node c) of the second subgraph $\mathcal{G}_t$ and the nodes $s_{t+1}$ (node e, node f, node g) of set $\mathcal{G}_{t+1}$ that are added to the second subgraph $\mathcal{G}_t$ to obtain the first subgraph $\mathcal{G}_{t+1}$. The (i,j) entry of the matrix $W_{t+1}^T$ is non-zero if $i^{th}$ node of $\mathcal{G}_t$ is connected to the $j^{th}$ node of the set $\mathcal{G}_{t+1}$.

The matrix $C_{t+1}$ comprises data corresponding to coupling between the nodes of the set $\mathcal{G}_{t+1}$. The edge connections in the graph $\mathcal{G}_{t+1}$ are formed by a set $\varepsilon_{t+1} = \{(e,f),(f,g),(b,e),(c,g)\}$.

Figure 6:
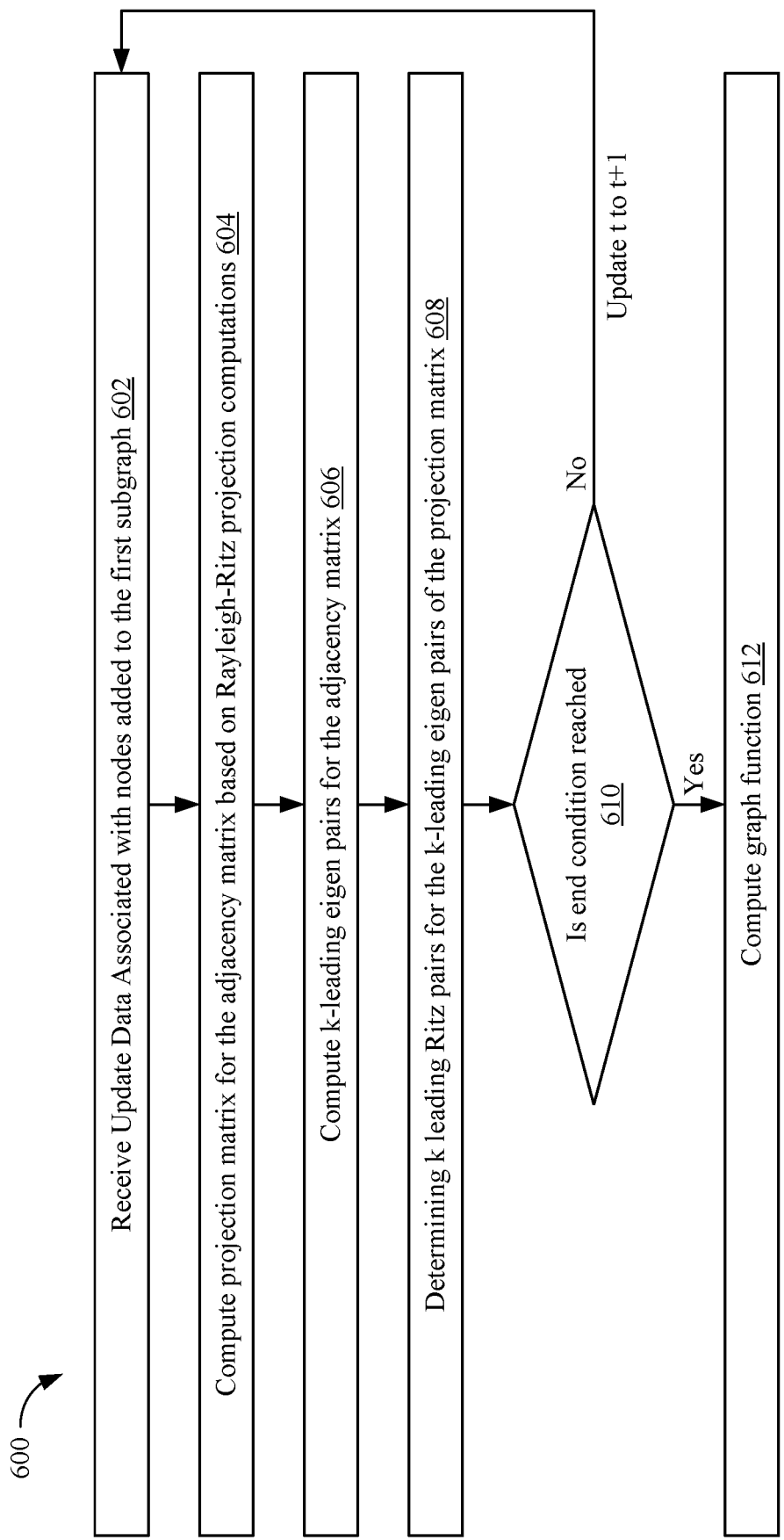
FIG. 6 is a flow chart of a method for computing the graph function, according to an embodiment of the present disclosure.

The surrogate adjacency matrix $A_{t+1}$ is then used to calculate the graph function, such as using a method shown in FIG. 6.

FIG. 6 is a flow chart of a method 600 for computing the graph function, according to an embodiment of the present disclosure. FIG. 6 is explained in conjunction with elements from FIG. 1, FIG. 2, FIG. 3, FIG. 4, and FIG. 5. With reference to FIG. 6, there is shown a flowchart of the method 600 that illustrates exemplary operations from 602 to 612, as described herein. The exemplary operations illustrated in the method 600 may start at 602 and may be performed by any computing system, apparatus, or device, such as by the computer 102 of FIG. 1 or the system 202 of FIG. 2. Although illustrated with discrete blocks, the exemplary operations associated with one or more blocks of the method 600 may be divided into additional blocks, combined into fewer blocks, or eliminated, depending on the particular implementation.

At 602, update data associated with nodes that are added to the first subgraph is received. For example, referring to FIG. 5, at a time step (also equivalently referred to as a time instance) t+1, the three additional nodes—node e, node f, and node g are added to the second subgraph $\mathcal{G}_t$. The addition of these additional nodes leads to formation of the first subgraph $\mathcal{G}_{t+1}$ at the time step t+1. Also, as discussed in conjunction with FIG. 5, the update data comprises the matrices $W_{t+1}$, $W_{t+1}^T$ and $C_{t+1}$.

At 604, a projection matrix for the adjacency matrix is computed based on Rayleigh-ritz projection computations. The update data is used to compute a projection matrix for the adjacency matrix at the time instance t+1 based on Rayleigh-ritz projection computations.

At the time instance t+1, the first subgraph $\mathcal{G}_{t+1}$ has the adjacency matrix $A_{t+1}$. To compute $A_{t+1}$ a projection matrix $Z_{t+1}$ is computed.

The problem of k-subgraph centrality is essentially equivalent to computing the k algebraically leading eigenpairs of an adjacency matrix, such as $A_{t+1}$. Sparse eigenvalue solvers compute a portion of eigenpairs by applying the Rayleigh-Ritz technique onto a subspace $\mathcal{Z} \in \mathbb{R}_n$ which, ideally, encapsulates an invariant subspace associated with the sought eigenvalues of the matrix $A_{t+1}$. In the absence of round-off errors, the eigenpairs of the matrix $A_{t+1}$ can be recovered as a subset of the Ritz pairs of the matrix $Z^T A Z$, where the matrix Z represents an orthonormal basis of $\mathcal{Z}$. Since $A_{t+1}$ is sparse, the standard approach to form the projection matrix Z is to employ a Krylov subspace method and set the projection subspace as:

$$\mathcal{Z} = \{v, Av, A^2v, A^3v, \ldots A^{m-1}v\},$$

for some integer $m \in \mathbb{Z}$ and random vector $v \in \mathbb{R}^n$ scaled so that $u^T y = 1$. For symmetric matrices, the Krylov subspace method of choice is the Lanczos iterative method. Assuming m−1 iterations, the Lanczos algorithm builds the relation:

$$AZ = ZT + \hat{v}e_m^t, \hat{v} \in \mathbb{R}^n$$

where $e_m$ denotes the last column of the m×m identity matrix, and Z denotes an orthonormal basis of $\mathcal{Z}$. The m×m tridiagonal matrix $T = Z^T A Z$ denotes the orthogonal embedding of A onto $\mathcal{Z}$ and its leading eigenvalues approximate those of A. More specifically, let $(\tau_i, f_i)$, i=1, ..., k, denote the k leading eigenpairs of the matrix T, such that $\tau_1 \geq \tau_2 \geq \ldots \geq \tau_k$. The $i^{th}$ leading eigenpair $(\lambda_i, x_i)$ of A is then approximated by the $i^{th}$ leading Ritz pair $(\tau_i, Zf_i)$. These are known as Rayleigh-Ritz projection computations and produces approximate eigenpairs of a matrix by applying the Galerkin condition, where the residual associated with each approximate eigenvector is orthogonal to the ansatz subspace. After the Rayleigh-Ritz projection computations, at 606, k-leading eigen pairs for the projection matrix are computed at time instance t+1. The projection matrix at time instance t+1 is denoted as $Z_{t+1}$. At 608, k leading Ritz pairs for the k-leading eigen pairs of the projection matrix are determined. At 610, it is determined whether an end condition is reached. If the designated condition is not reached, the time instance t is updated to the time instance t+1 and operations 602-610 are repeated until the end condition is reached. The designated end condition is based on availability of the update data for the graph $\mathcal{G}$. As long as update data is available, the method 600 and corresponding operations 602-610 are performed iteratively.

Once the designated end condition is reached, and there is no further update data available, at 612, the graph function is computed.

In one embodiment of the present disclosure, the graph function is the subgraph centrality function. Computation of the subgraph centrality function is shown in FIG. 7.

Figure 7:
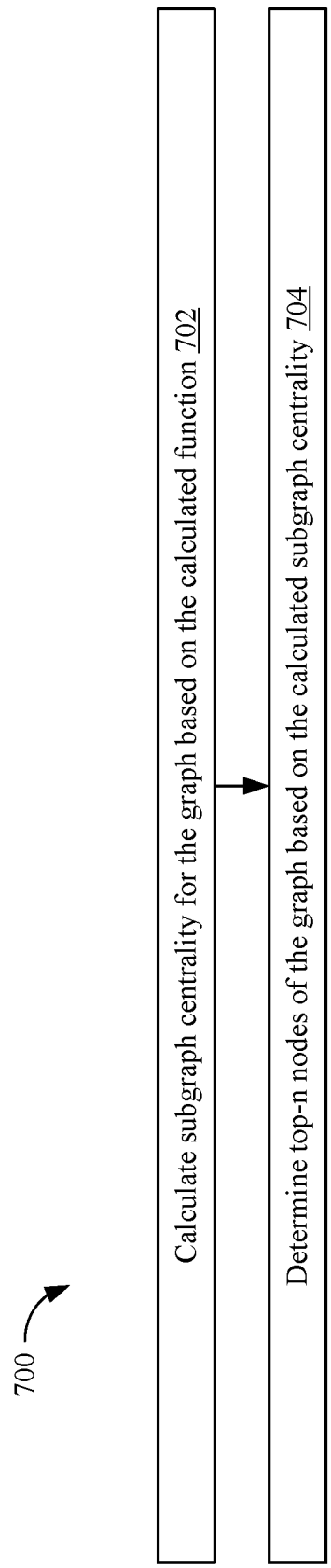
FIG. 7 is a flow chart of a method for computing the graph function, according to an embodiment of the present disclosure.

FIG. 7 is a flow chart of a method 700 for computing the graph function, according to an embodiment of the present disclosure. FIG. 7 is explained in conjunction with elements from FIG. 1, FIG. 2, FIG. 3, FIG. 4, FIG. 5 and FIG. 6. With reference to FIG. 7, there is shown a flowchart of the method 700 that illustrates exemplary operations from 702 to 704, as described herein. The exemplary operations illustrated in the method 700 may start at 702 and may be performed by any computing system, apparatus, or device, such as by the computer 102 of FIG. 1 or the system 202 of FIG. 2. Although illustrated with discrete operations, the exemplary operations of the method 700 may be divided into additional sub-operations, combined into fewer operations, and/or eliminated, depending on the particular implementation.

In one embodiment of the present disclosure, the graph function calculated in the method 600 is used to calculate the subgraph centrality for the graph $\mathcal{G}$. Thus, at 702, the subgraph centrality for the graph $\mathcal{G}$ is calculated based on the calculated graph function. For example, the k leading Ritz pairs determined at the time of reaching the end condition are used to calculate the subgraph centrality of the graph $\mathcal{G}$ at the time instance of reaching the end condition. For example, at the time instance t+1, the $i^{th}$ leading eigenpair $(\lambda t+1,i, xt+1,i)$ of $A_{t+1}$ is approximated by the ith leading Ritz pair $(\tau t+1,i, Zt+1 rt+1,i)$.

In an embodiment of the present disclosure, the Rayleigh-Ritz eigenvalue problem is solved through a dense eigenvalue solver. Therefore, the computational complexity of this task is cubic with respect to the number of columns of the projection matrix $Z_{t+1}$. In one embodiment of the present disclosure, computing the projection matrix Zt+1 for the adjacency matrix $A_{t+1}$ includes computing the k leading Ritz pairs for the projection matrix to be same as k leading eigen pairs of the adjacency matrix at the time instance t+1. The Ran $(Z_{t+1})$ is set in such a way that k dominant Ritz pairs of the matrix $Z_{t+1}^T A_{t+1} Z_{t+1}$ are the exact k dominant eigenpairs of the matrix $A_{t+1}$. In exact arithmetic, performing a Rayleigh-Ritz projection with a matrix $Z_{t+1}$ such that Ran $(Z_{t+1}) \equiv$ Ran $(A_{t+1})$ returns the exact eigenvectors associated with all non-zero eigenvalues of the matrix $A_{t+1}$. Thus, the projection matrix $Z_{t+1}$ is computed as:

$$Z_{t+1} = \begin{bmatrix} X_{t,k} \\ & I_{s_{t+1}} \end{bmatrix} \quad \text{Eq. (4)}$$

In one embodiment of the present disclosure, computing the projection matrix for the adjacency matrix comprises computing a matrix formed by computing orthonormal basis components for the k-leading eigen pairs of the adjacency matrix.

Let $F_{t+1} = (I_{n_t} - X_{t,k} X_{t,k}^T) W_{t+1}^T$, and $Q_{t+1} = \text{Orth}(F_{t+1})$. Thus, the projection matrix $Z_{t+1}$ is computed as:

$$Z_{t+1} = \begin{bmatrix} X_{t,k} Q_{t+1} \\ & I_{s_{t+1}} \end{bmatrix} \quad \text{Eq. (5)}$$

The projection matrix thus forms an orthonormal basis for the column space of the matrix $A_{t+1}$.

In one embodiment of the present disclosure, the matrix $Q_{t+1}$ is replaced by low-rank approximation of the matrix $F_{t+1}$. The target rank is $l_{t+1} \in \mathbb{N}$. After computing the rank-$\ell_{t+1}$ approximation of the matrix $F_{t+1}$, $Q_{t+1}$ in Eq. (5) is replaced by matrix $F_{t+1,l_{t+1}}$ formed by the $\ell_{t+1}$ dominant left singular vectors of the matrix $F_{t+1}$.

In one embodiment of the present disclosure, computing the projection matrix for the adjacency matrix comprises computing the k-leading eigen pairs of the adjacency matrix based on Schur components. In this case, the projection matrix $Z_{t+1}$ is computed as:

$$Z_{t+1} = \begin{bmatrix} X_{t,k} F_{t+1,l_{t+1}} \\ & Y_{t+1} \end{bmatrix} \quad \text{Eq. (6)}$$

where $$Y_{t+1} \in \mathbb{R}^{s_{t+1} \times \hat{k}}$$

$Y_{t+1}^T Y_{t+1} = I_{\hat{k}}$, and $\hat{k} \leq k$

In one embodiment of the present disclosure, computing the projection matrix for the adjacency matrix comprises approximating the k-leading eigen pairs of the adjacency matrix using k dominant eigen vectors of a symmetric matrix. Thus, the projection matrix $Z_{t+1}$ is computed as:

$$Z_{t+1} = \begin{bmatrix} X_{t,k} F_{t+1,l_{t+1}} \\ & I_{l_{t+1}} \end{bmatrix} \quad \text{Eq. (7)}$$

After computing the projection matrix $Z_{t+1}$ in any manner described above, k-leading eigen pairs of $A_{t+1}$ are used to calculate k-subgraph centrality for graph $\mathcal{G}$ as described in Eq. (2) earlier. At 704, the calculated k-subgraph centrality for graph $\mathcal{G}$ is then further used to determine top-N set of nodes of the graph $\mathcal{G}$. The top-N set of nodes are nodes of the graph $\mathcal{G}$ with indices associated with highest subgraph centrality data.

In one embodiment of the present disclosure, these top-N nodes are then used to identify most influential nodes of the graph $\mathcal{G}$.

In an embodiment, each time the time step t is updated, the updated adjacency matrix is computed as described above. Further, a previously stored adjacency matrix corresponding to a previous time instance t, such as $A_t$, is replaced with the adjacency matrix corresponding to the subsequent time instance t+1, such as $A_{t+1}$. Thus, each adjacency matrix corresponding to a subgraph is accessed only once, leading to savings in computing efficiency and storage. Also, the approximation of $A_{t+1}$ using the projection matrix computations as described above, has linear computations complexity in some embodiments, providing a very efficient algorithm for determination of updates to a graph, and subsequently most influential nodes of the graph.

FIG. 8 is a diagram that illustrates an example algorithm 800 for identifying most influential nodes of a dynamic graph, in accordance with an embodiment of the present disclosure.

At 802, the algorithm 800 starts with a matrix $A_1$ and, at 804, k-leading eigen pairs of $A_1$ are computed.

The matrix $A_1$ is then augmented to matrix $A_2$ by processing additional nodes (and corresponding edges) that are added to $A_1$ to obtain $A_2$. Keeping $A_1$ in system 202 memory is no longer necessary as this matrix is now replaced, at 804, by the action of $(X_{1,k}, \Lambda_{1,k} X_{1,k}^T)$. This matrix is kept in product form and never formed explicitly. At 806, k leading eigenpairs of $A_2$ are approximated by updating $(X_{1,k}, \Lambda_{1,k})$ to $(X_{2,k}, \Lambda_{2,k})$ via Rayleigh-Ritz projection computations described earlier. This procedure is repeated until all nodes and edges of graph $\mathcal{G}$ are processed.

In an embodiment, k leading eigenpairs of the entire adjacency matrix A are approximated in this process. At 808, these k eigenpairs are then used to approximate the graph function $SC_k(G)$ as per eq. (2) and at 810, return the indices associated with its N largest entries.

The algorithm 800 is executed for each time instance by iteratively updating t to t+1 and updating the k leading eigenpairs of matrix $A_t$ to those of matrix $A_{t+1}$ using the projection matrix $Z_{t+1}$ and computing its value as discussed previously. A method to perform such update is illustrated in FIG. 9.

Figure 9:
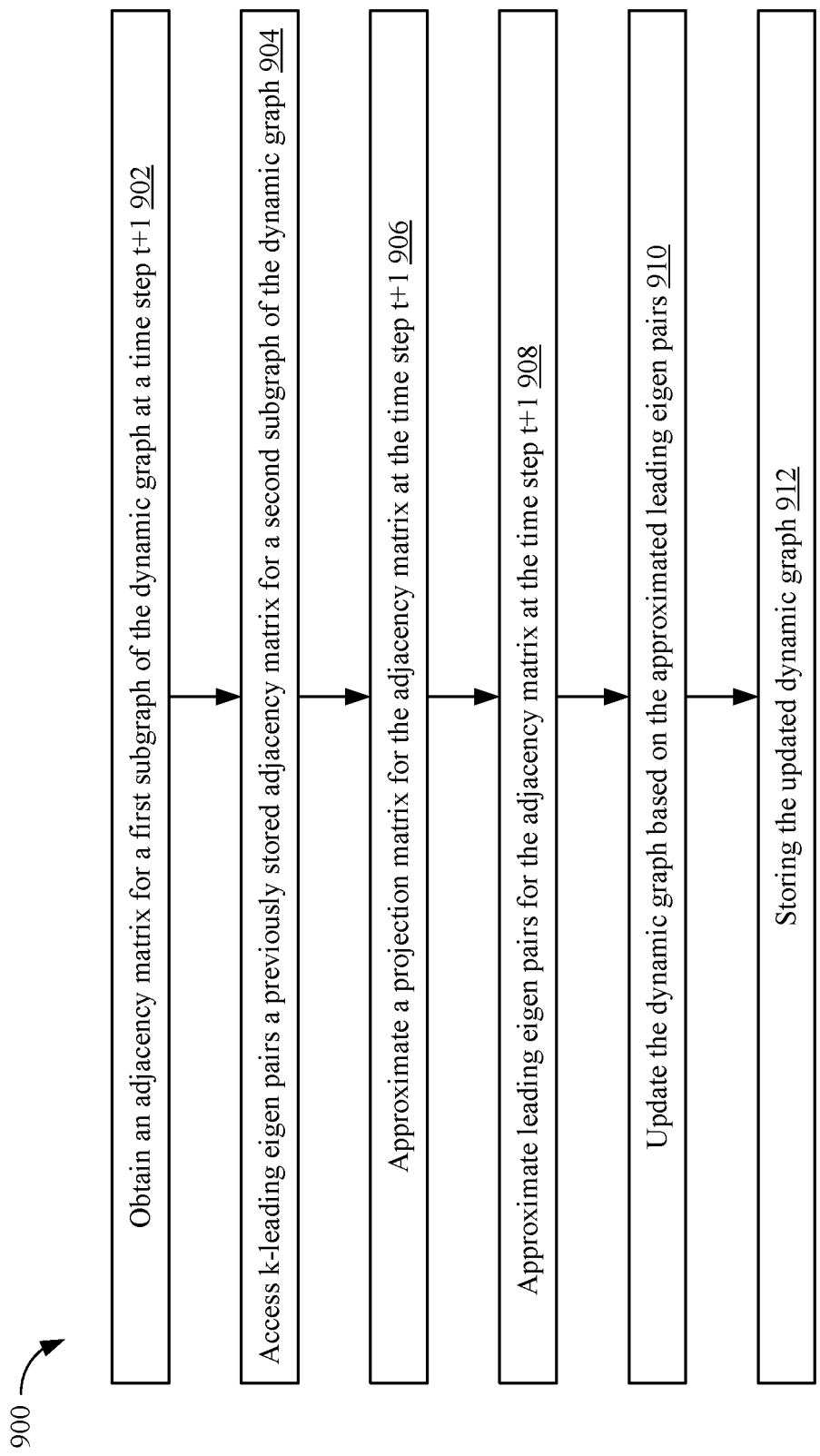
FIG. 9 is a flow chart of a method for updating a dynamic graph, according to an embodiment of the present disclosure.

FIG. 9 is a flow chart of a method 900 for updating a dynamic graph, according to an embodiment of the present disclosure. FIG. 9 is explained in conjunction with elements from previous figures. With reference to FIG. 9, there is shown a flowchart of the method 900 that illustrates exemplary operations from 902 to 912, as described herein. The exemplary operations illustrated in the method 900 may start at 902 and may be performed by any computing system, apparatus, or device, such as by the computer 102 of FIG. 1 or the system 202 of FIG. 2. Although illustrated with discrete blocks, the exemplary operations associated with one or more blocks of the method 900 may be divided into additional blocks, combined into fewer blocks, and/or eliminated, depending on the particular implementation.

In one embodiment of the present disclosure, at 902, an adjacency matrix for a first subgraph of the dynamic graph is obtained. For example, the adjacency matrix $A_{t+1}$ for the graph $\mathcal{G}_{t+1}$ is obtained, such as from out of system 202's memory. At 904, a set of k-leading eigen pairs for a previously stored adjacency matrix for a second subgraph is obtained. For example, the previously stored adjacency matrix $A_t$ has a set of leading eigen pairs $X_{t,k}, \Lambda_{t,k}$ that are stored in the system 202 memory. At 906, a projection matrix for the adjacency matrix at time instance t+1 is approximated. For example, the projection matrix $Z_{t+1}$ is approximated using any of Eq. (4)-Eq. (7) described previously for the matrix $A_{t+1}$.

At 908, k-leading eigen pairs for the matrix $A_{t+1}$ are approximated. For example, k leading eigen pairs of $Z_{t+1}^T A_{t+1} Z_{t+1}$ are computed. K-leading Ritz pairs are further formed using the matrix $(X_{t+1,k}, \Lambda_{t+1,k})$. At 910, the k-leading Ritz pairs are used to update the dynamic graph and at 912, the updated dynamic graph is then stored in the system 202 memory.

The storing of data for the dynamic graph (also referred to as dynamic graph data interchangeably) in the embodiments described above is efficient and saves bandwidth because graph data is approximated in the form of matrix products built using Rayleigh-Ritz projections. Further, the dynamic graph data is augmented using a rank-k partial spectral factorization, which are further used to compute a graph function, such as subgraph centrality, and used to identify most influential nodes of the dynamic graph, that is required in many real world applications such as—social networks, road networks, biological compounds analysis and the like.

In one or more embodiments of the present disclosure, a pass over subgraphs and their adjacency matrix is performed only once and thus is appealing for large graphs which either cannot fit in the system memory or become available dynamically.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A computer-implemented method, comprising:
    accessing an application to acquire update data associated with a graph at each time instance of a plurality of time instances, wherein the application stores data associated with the graph;
    computing an adjacency matrix corresponding to a first subgraph of the graph for a current time instance of the plurality of time instances;
    storing, in a system memory, the adjacency matrix by replacing a previously stored adjacency matrix in the system memory; and
    accessing the adjacency matrix once for computing a function of the adjacency matrix, wherein the computing of the function is based on:
        partial spectral factorization data of the previously stored adjacency matrix for a second subgraph of the graph, and
        the update data associated with nodes that are added to the second subgraph to obtain the first subgraph, wherein the second subgraph is a subset of the first subgraph.

2. The computer-implemented method of claim 1, wherein
the adjacency matrix of the first subgraph is associated with a state of the graph at the current time instance,
the previously stored adjacency matrix of the second subgraph is associated with a state of the graph at a previous time instance of the plurality of time instances, and
the previous time instance is earlier than the current time instance.

3. The computer-implemented method of claim 1, further comprising:
computing subgraph centrality data for the graph based on the computing of the function; and
determining top-N set of nodes of the graph based on the computing of the subgraph centrality data, wherein the top-N set of nodes are nodes of the graph with indices associated with highest subgraph centrality data.

4. The computer-implemented method of claim 3, wherein the graph is a dynamic graph and the top-N set of nodes are most influential nodes of the dynamic graph.

5. The computer-implemented method of claim 4, wherein
the dynamic graph corresponds to a graph approximation of a social network,
nodes of the dynamic graph represent users of the social network and edges of the dynamic graph represent connections between the users of the social network, and
the most influential nodes of the dynamic graph represent the users of an influencer user type in the social network.

6. The computer-implemented method of claim 1, further comprising:
determining the partial spectral factorization data based on computing of a projection matrix for the adjacency matrix of the first subgraph, based on Rayleigh-Ritz projection computations.

7. The computer-implemented method of claim 6, further comprising:
a) receiving the update data associated with the nodes that are added to the second subgraph at the current time instance;
b) computing the projection matrix for the adjacency matrix at the current time instance based on the Rayleigh-Ritz projection computations;
c) computing k-leading eigen pairs for the projection matrix at the current time instance;
d) determining k leading Ritz pairs for the k-leading eigen pairs of the projection matrix;
e) updating a previous time instance of the plurality of time instances with the current time instance; and
f) repeating steps a-e until a designated end condition is reached.

8. The computer-implemented method of claim 7, wherein the designated end condition is based on availability of the update data for the graph.

9. The computer-implemented method of claim 8, further comprising computing subgraph centrality data for the graph based on the determining of the k leading Ritz pairs at a time of reaching the designated end condition.

10. The computer-implemented method of claim 7, wherein the computing of the projection matrix for the adjacency matrix comprises: computing, at the current time instance, the k leading Ritz pairs for the projection matrix to be same as the k leading eigen pairs of the adjacency matrix.

11. The computer-implemented method of claim 7, wherein the computing of the projection matrix for the adjacency matrix comprises computing the k-leading eigen pairs of the adjacency matrix based on Schur components.

12. The computer-implemented method of claim 7, wherein the computing of the projection matrix for the adjacency matrix comprises computing a matrix formed by computing orthonormal basis components for the k-leading eigen pairs of the adjacency matrix.

13. The computer-implemented method of claim 7, wherein the computing of the projection matrix for the adjacency matrix comprises approximating the k-leading eigen pairs of the adjacency matrix using k dominant eigen vectors of a symmetric matrix.

14. The computer-implemented method of claim 7, wherein the previously stored adjacency matrix corresponds to the previous time instance of the plurality of time instances.

15. A computer-implemented method for updating a dynamic graph, the computer-implemented method comprising:
accessing an application to acquire update data associated with the dynamic graph at each time instance of a plurality of time instances, wherein the application stores data associated with the dynamic graph;
computing an adjacency matrix for a first subgraph of the dynamic graph at a current time instance of the plurality of time instances;
accessing a projection matrix for a previously stored adjacency matrix for a second subgraph of the dynamic graph;
storing, in a system memory, the adjacency matrix by replacing the previously stored adjacency matrix in the system memory;
approximating a projection matrix for the adjacency matrix at the current time instance based on:
the accessed projection matrix for the previously stored adjacency matrix at a previous time instance of the plurality of time instances; and
the update data for the dynamic graph received at the current time instance;
approximating k-leading eigen pairs for the adjacency matrix at the current time instance based on the approximated projection matrix;
updating the dynamic graph based on the approximating of the k-leading eigen pairs; and
storing the updated dynamic graph.

16. The computer-implemented method of claim 15, further comprising:
computing subgraph centrality data for the stored updated dynamic graph; and
determining most influential nodes of the dynamic graph based on the computing of the subgraph centrality data.

17. The computer-implemented method of claim 15, wherein the updating of the dynamic graph based on the approximated k-leading eigen pairs is performed iteratively until a designated end condition is met.

18. The computer-implemented method of claim 17, wherein the designated end condition comprises a determination of availability of the update data for the dynamic graph.

19. A system, comprising:
circuitry configured to:
access an application to acquire update data associated with a graph at each time instance of a plurality of time instances, wherein the application stores data associated with the graph;

compute an adjacency matrix corresponding to a first subgraph of the graph for a current time instance of the plurality of time instances;

store, in a system memory, the adjacency matrix by replacement of a previously stored adjacency matrix in the system memory; and access the adjacency matrix once to compute a function of the adjacency matrix, wherein the computation of the function is based on:

partial spectral factorization data of the previously stored adjacency matrix for a second subgraph of the graph, and the update data associated with nodes that are added to the second subgraph to obtain the first subgraph, wherein the second subgraph is a subset of the first subgraph.

20. The system of claim 19, wherein the adjacency matrix of the first subgraph is associated with a state of the graph at the current time instance, the previously stored adjacency matrix of the second subgraph is associated with a state of the graph at a previous time instance of the plurality of time instances, and, the previous time instance is earlier than the current time instance.

21. The system of claim 19, wherein the circuitry is further configured to:

compute subgraph centrality data for the graph based on the computed function; and determine top-N set of nodes of the graph based on the computed subgraph centrality data, wherein the top-N set of nodes are nodes of the graph with indices associated with highest subgraph centrality data.

22. The system of claim 21, wherein the graph is a dynamic graph and the top-N set of nodes are most influential nodes of the dynamic graph.

23. The system of claim 19, wherein the circuitry is further configured to determine the partial spectral factorization data based on computation of a projection matrix for the adjacency matrix of the first subgraph, based on Rayleigh-Ritz projection computations.

24. The system of claim 23, wherein the circuitry is further configured to:

a) receive the update data associated with additional nodes of the first subgraph at the current time instance;

b) compute the projection matrix for the adjacency matrix at the current time instance based on the Rayleigh-Ritz projection computations;

c) compute k-leading eigen pairs for the projection matrix at the current time instance;

d) determine k leading Ritz pairs for the k-leading eigen pairs of the projection matrix;

e) update a previous time instance of the plurality of time instances with the current time instance; and f) repeat steps a-e until a designated end condition is reached.

25. A computer program product, the computer program product comprising a computer-readable storage medium having program instructions embodied therewith, the program instructions executable by a system to cause the system to:

access an application to acquire update data associated with a graph at each time instance of a plurality of time instances, wherein the application stores data associated with the graph;

compute an adjacency matrix corresponding to a first subgraph of the graph for a current time instance of the plurality of time instances;

store, in a system memory, the adjacency matrix by replacing a previously stored adjacency matrix in the system memory; and access the adjacency matrix once to compute a function of the adjacency matrix, wherein the computation of the function is based on:

partial spectral factorization data of the previously stored adjacency matrix for a second subgraph of the graph, and the update data associated with nodes that are added to the second subgraph to obtain the first subgraph, wherein the second subgraph is a subset of the first subgraph.

* * * * *